C. L. JACKSON.
Wheel-Plows.
No. 199,443. Patented Jan. 22, 1878.
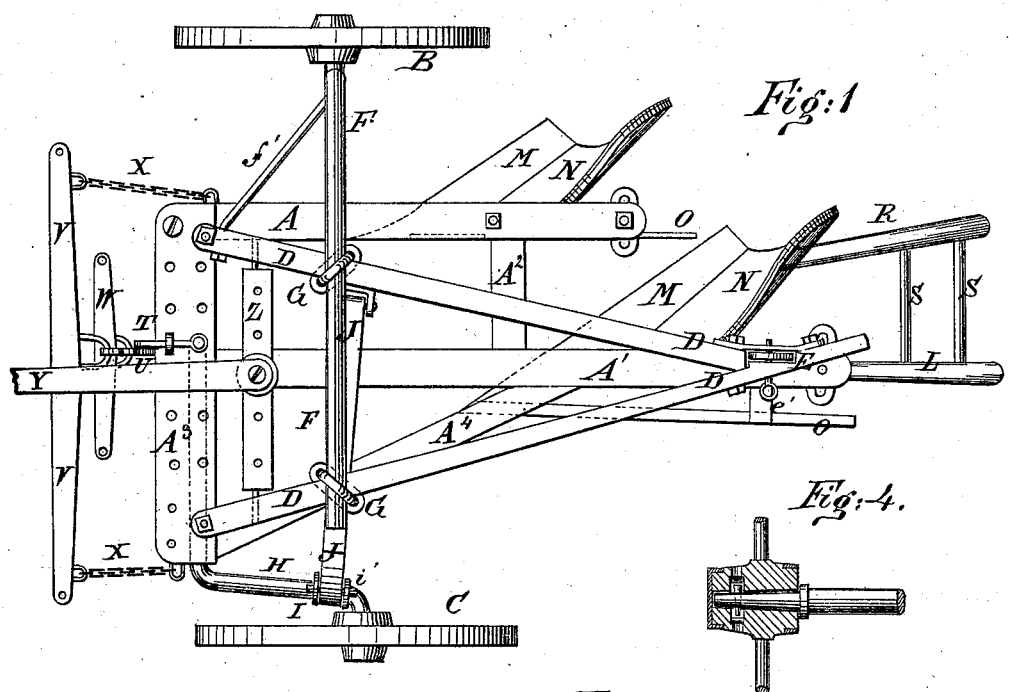
Fig:1
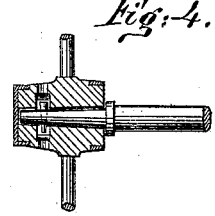
Fig:4.
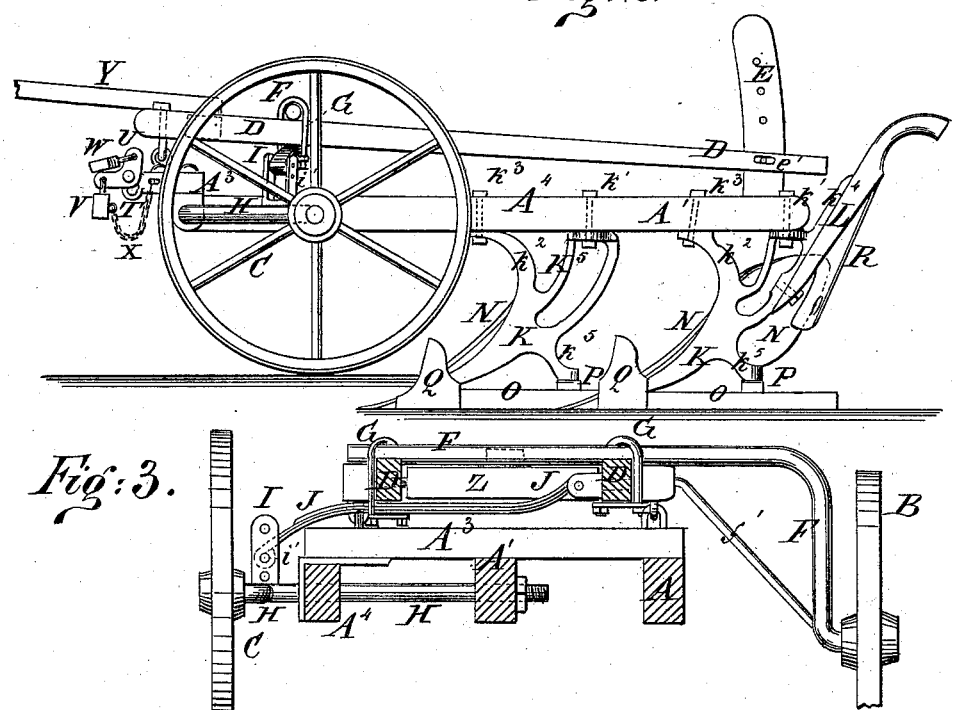
Fig:2.
Fig:3.
WITNESSES:
INVENTOR:
C. L. Jackson.
BY
ATTORNEYS.

UNITED STATES PATENT OFFICE.

CORNEALIUS L. JACKSON, OF MILLERSBURG, ILLINOIS.

IMPROVEMENT IN WHEEL-PLOWS.

Specification forming part of Letters Patent No. 199,443, dated January 22, 1878; application filed April 23, 1877.

*To all whom it may concern:*

Be it known that I, CORNEALIUS L. JACKSON, of Millersburg, in the county of Mercer and State of Illinois, have invented a new and Improved Wheel-Plow, of which the following is a specification:

In the accompanying drawings, Figure 1 is a top view of my improved plow. Fig. 2 is a side view of the same. Fig. 3 is a cross-section of the same, taken in the rear of the wheels. Fig. 4 is a detail section of the hub.

Similar letters of reference indicate corresponding parts.

The object of this invention is to furnish an improved wheel-plow which shall be so constructed that it may be adjusted for use as a gang-plow or as a single sod or old-land plow, with or without wheels, and which shall be simple in construction and convenient in use.

The invention will first be described in connection with the drawing, and then pointed out in the claim.

In the drawings, A is the beam of the forward plow, and $A^1$ is the beam of the rear plow. The beam $A^1$ is made longer than the beam A to bring the rear plow to the proper distance in the rear of the forward plow. The beams A $A^1$ are connected at or near the rear end of the beam A by a cross-bar, $A^2$. To the forward ends of the beams A $A^1$ is attached a cross-bar, $A^3$, the near end of which is extended, and is attached to the forward end of an inclined brace, $A^4$. The rear end of the brace $A^4$ is attached to the side of the beam $A^1$ near the end of the cross-bar $A^2$. To the end parts of the cross-bar $A^3$ are hinged, by eyebolts or other convenient means, the forward ends of the bars D, the rear ends of which meet at an angle, forming a V-lever.

To the rear end of the plow-beam $A^1$ is attached a curved bar, E, which passes up through a slot in the rear angular end of the V-lever D, and has a number of holes formed through it to receive a pin, $e'$, which also passes through a hole in the end of the lever D, to hold the said lever securely in any position into which it may be raised.

B is the furrow-wheel, which revolves upon the journal of the axle F. The axle F is bent twice at right angles, and its inner arm rests upon the top of the lever D, and is secured to said lever by clips G, so that the axle F may be adjusted to move the wheel B out and in, as may be required.

The crank-axle F is adjusted with its crank in a vertical position, and the draft-strain upon it is sustained by a brace, $f'$, the rear end of which is attached to the said axle F near the inner end of its journal. The other end of the brace $f'$ is attached to the forward end of one of the bars D.

C is the land-side wheel, which revolves upon the journal of the axle H. The axle H is bent twice at right angles, is placed with its crank in a horizontal position, and its inner arm is pivoted to the forward ends of the plow-beam $A^1$ and brace $A^4$. The crank of the axle H is made of such a length that the axis of the wheel C may be in the rear of the axis of the wheel B, so that when the lever D is raised to allow the plows to enter the ground the wheel C may rise faster than the wheel B, so that the frame of the machine may remain level while the plows are entering and working in the ground, and while one wheel is running upon the unplowed land and the other is running in the furrow.

To the upper side of the crank-axle H, at the inner end of its journal, is attached the bend of a U bar or strap, I, in the arms of which are formed a number of holes to receive the bolt $i'$, by which it is secured to the end of the spring J. The spring J is secured to the near bar of the lever D by the near clip G, and its inner end is secured to the side of the off bar of said lever D.

K is the plow-standard, upon the upper end of which is formed a plate having a transverse slot formed in it to receive the bolt $k^1$, by which it is secured to the plow-beam. Upon the forward upper part of the standard K is formed a brace, $k^2$, which is curved upward and forward, and has a hole formed through its upper end to receive the bolt $k^3$, by which it is secured to the plow-beam. By this construction, by loosening the bolt $k^1$, the plow may be turned upon the bolt $k^3$ as a pivot to or from the land, as desired.

Upon the rear upper part of the standard K is formed an arm, $k^4$, which inclines upward and to the rearward, and to it is bolted the land-side handle L. The lower part of the standard K is curved forward with an outward bend, and to it are secured the share M and the mold-board N. To the land-side end of the share M is secured the forward end of the land-side O, the rear part of which is attached to the land-side end of the cross-brace P. The other end of the cross-brace P is attached to the lower rear part of the mold-board N.

To the middle part of the cross-brace P is attached an arm, $k^5$, formed upon the lower rear part of the standard K.

To the forward part of the land-side O is secured the colter Q, the rear edge of the lower part of which rests against a shoulder formed upon said land-side. By this construction the offset or bend of the lower part of the standard K leaves the throat open, so that the plow will not be choked with rubbish, and gives the plows a center draft.

R is the mold-board handle, the lower end of which is bolted to the mold-board N, and its upper part is connected with the land-side handle L by rounds S.

In the cross-bar $A^3$ are formed a number of sets of holes to receive the bolts of the clevis T, in the front or bend of which are formed a number of holes to receive the bolt that passes through the angle of the small bent lever U. To the lower end of the bent lever U is pivoted a long double-tree, V, and to the upper end of said bent lever U is pivoted a short double-tree, W. This construction enables four horses to be worked abreast for drawing the machine.

To the ends of the cross-bar $A^3$ are attached two short chains, X, the forward ends of which are attached to the long double-tree V near its ends. The chains X are designed to give the horses a better control over the machine in turning, as the tongue Y is of no service in guiding the machine. The tongue Y is pivoted to the roller Z in such a way as to have a free lateral and vertical movement. The ends of the roller Z are pivoted to the bars of the lever D near their forward ends. The mold-board N is plated with zinc or white metal, the lower edge of said zinc or white-metal plate meeting the edge of the share M, so as to form a smooth joint. The zinc or white-metal facing will prevent pasty or gummy soils from sticking to the mold-board, and thus enable furrows to be turned in such soils.

The hubs of the wheels B C are closed at their outer ends, have holes formed through the middle parts to enable the linchpins to be inserted, and have ring-grooves in the middle parts of their inner surfaces, through which the ends of the linchpins move when the wheels revolve. This construction effectually protects the journals from dust and other dirt.

The mold-board N may be cut out of steel slabs, in which case the grain of the steel should run up from the share, and the lower edge of the mold-board should have a rabbet formed in it to receive and fit upon the edge of the share.

Having thus described my invention, I claim as new and desire to secure by Letters Patent—

1. The combination of the V-lever D, crank-axle H, U-strap I, and spring J with the plow-beams and wheels, as and for the purpose described.

2. The standard K, made with a lateral offset or bend, and provided with a slotted top plate, the curved brace $k^2$, the handle-seat $k^4$, and the arm $k^5$, in combination with the beam, the mold-board, and the share of a plow, substantially as herein shown and described.

CORNEALIUS L. JACKSON.

Witnesses:
SCOTT JACKSON,
WILLIAM H. LEECH.